United States Patent
Liu et al.

(10) Patent No.: US 12,191,738 B2
(45) Date of Patent: Jan. 7, 2025

(54) RESONANT VIBRATION ACTUATOR

(71) Applicant: TOPRAY MEMS INC., Hsinchu (TW)

(72) Inventors: Chin-Sung Liu, Hsinchu (TW);
Hsiao-Ming Chien, Hsinchu (TW);
Chi-Ling Chang, Hsinchu (TW);
Shin-Ter Tsai, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 226 days.

(21) Appl. No.: 17/988,752

(22) Filed: Nov. 16, 2022

(65) Prior Publication Data
US 2024/0113607 A1  Apr. 4, 2024

(30) Foreign Application Priority Data
Oct. 4, 2022  (TW) .................. 111137724

(51) Int. Cl.
*H02K 33/18* (2006.01)
*G08B 6/00* (2006.01)
*H02K 5/22* (2006.01)

(52) U.S. Cl.
CPC ............. *H02K 33/18* (2013.01); *H02K 5/225* (2013.01); *G08B 6/00* (2013.01)

(58) Field of Classification Search
CPC ........ H02K 33/18; H02K 5/225; H02K 33/16; H02K 33/00; H02K 1/12; H02K 1/34; G08B 6/00
USPC ......................................... 310/15, 17, 36, 81
See application file for complete search history.

(56) References Cited

U.S. PATENT DOCUMENTS

| | | | | |
|---|---|---|---|---|
| 10,090,744 B2* | 10/2018 | Huang | .................... | H02K 33/00 |
| 2005/0275294 A1* | 12/2005 | Izumi | ..................... | H02K 33/16 |
| | | | | 310/15 |
| 2006/0250201 A1* | 11/2006 | Hashimoto | .......... | H01H 50/005 |
| | | | | 335/78 |
| 2013/0313919 A1* | 11/2013 | Nakamura | ............. | H02K 33/16 |
| | | | | 310/25 |
| 2021/0211030 A1* | 7/2021 | Li | .......................... | H02K 33/18 |
| 2023/0275496 A1* | 8/2023 | Takahashi | ................ | B06B 1/04 |
| | | | | 310/17 |
| 2024/0110607 A1* | 4/2024 | Gaspar | .................. | F16F 1/3835 |

* cited by examiner

*Primary Examiner* — Ahmed Elnakib
(74) *Attorney, Agent, or Firm* — Lin & Associates Intellectual Property, Inc.

(57) ABSTRACT

A resonant vibration actuator includes a casing, a mover, a plurality of electromagnet sets, two elastic suspensions, and a connecting circuit. The casing is provided with connection terminals for connection on the outside of the casing. The mover has a mover frame, a plurality of permanent magnet units, and two magnetic backs. The permanent magnet units and the magnetic backs are arranged in the mover frame and the electromagnet sets are arranged between the permanent magnet units. Elastic suspensions are connected to the casing and the mover respectively through two connection portions at both ends. The connecting circuit is used to connect the electromagnet sets and the connection terminals outside the casing. By energizing the electromagnet sets, the electromagnet sets act on the permanent magnet units to make the mover move relatively in the casing to generate vibration.

10 Claims, 5 Drawing Sheets

RESONANT VIBRATION ACTUATOR

BACKGROUND OF THE INVENTION

1. Field of the Invention

The present invention relates generally to a resonant vibration actuator, and more particularly, to a resonant vibration actuator able to generate vibration in two different directions.

2. The Prior Arts

Most of the electronic devices on the market, such as portable communication devices, game consoles, tablet computers, touchpads and other electronic products, have begun to configure the function of tactile feedback. Some electronic devices use vibration actuators to generate vibrations, including for notifying portable communication devices of incoming calls, for providing tactile feedback from game consoles, and the like.

A vibration actuator used providing such function usually comprises a casing 10, and an electromagnet with a coil provided in the casing 10, and a vibrating mover 20 with a permanent magnet in the casing 10. By applying alternating current to the permanent magnet and electromagnet arranged in the casing 10 to generate a magnetic field with alternating polarities, and generating vibrations by alternately generating attractive and repulsive forces between the permanent magnet and the electromagnet.

SUMMARY OF THE INVENTION

The primary objective of the present invention is to provide a resonant vibration actuator that can generate vibration in two different directions to increase the diversity of tactile feedback.

In order to achieve the foregoing objective, the present invention provides a resonant vibration actuator able to generate vibrations in two directions, comprising: a casing, a mover, a plurality of electromagnet sets, two elastic suspensions, and a connecting circuit; the casing including: a bottom and an upper cover, the upper cover covering and able to engage with the bottom to form a rectangular box, a connection terminal being disposed outside the casing to electrically connect an external circuit; the mover comprising: a mover frame, a plurality of permanent magnet units, and two magnetic backs, the magnetic backs being disposed in and closely against the mover frame, the plurality of permanent magnet units being arranged side-by-side and adjacent to the magnetic backs, the magnetic backs and the permanent magnet units forming a magnetic circuit to suppress magnetic leakage of magnetic field of the permanent magnet unit to the outside; each electromagnet set including: a magnetic core, two conductive bobbin flanges, and a coil, the two conductive bobbins being located at two ends of the magnetic core respectively, and forming a bobbin with the magnetic core, the coil being wound on the bobbin, the electromagnet set being disposed between the two permanent magnet units of the mover, and forming an electromagnetic driving portion together with the permanent magnet unit and the magnetic back; each elastic suspension comprising: two connection portions and a connection block, the two connection portions being respectively located at two ends of the elastic suspension, with one fixed to the casing by the connection block, and the other connected to the mover; the connection circuit being used for connecting the coil of the electromagnet set and the connection terminal outside the casing; wherein, by energizing the coil, the electromagnet applying force on the permanent magnet unit to cause the mover to move in the casing to generate vibration.

In a preferred embodiment, the electromagnet set is further fixed by an electromagnet rack to either or both of the bottom and the upper cover of the casing.

In a preferred embodiment, a first direction is defined to be parallel to the magnetic core, a second direction is defined to be perpendicular to the first direction and parallel to the bottom, and a third direction is defined to be perpendicular to the first direction and the second direction, the electromagnetic driving portion uses magnetic force to drive the mover along the second direction and the third direction; the elastic suspension is connected to the casing and supports the mover in the casing, so as to make the mover vibrate in the casing along the second direction and the third direction.

In a preferred embodiment, the elastic suspension is a plate spring formed by cutting and bending, and further includes two connection portions, two necks, and a deforming support portion, wherein the configuration, in sequence, is a connection portion, a neck, a deformation support portion, a neck, and a connection portion; the two connection portions are located at the two ends of the elastic suspension along the first direction, wherein junction of the connection portion fixed to the casing by the connection block and the junction of the connection portion connected to the mover are located on two different sides of the elastic suspension in the second direction, and each connection portion is respectively connected with the deformation support portion by a neck with a smaller width.

In a preferred embodiment, both ends in the third direction of the middle portion of the elastic suspension in the first direction have L-shaped features bent outward toward the second direction, with a hole along the third direction, and the L-shaped feature is still connected to the elastic suspension without disconnection; a side of the elastic suspension perpendicular to the second direction has a hole, and the hole in the third direction and the first direction does not exceed the elastic suspension, and the elastic suspension has no disconnection in the third direction.

In a preferred embodiment, the deformation support portion is a frame with a hollow portion, the frame is bent into a 3-sided square C-shape, and the bending directions of the upper and lower sides of the 3-sided square C-shape are the same as the direction of the connection block; the hollow portion is also bent into a 3-sided square C-shape, and the hollow portion includes hollow extending towards both ends in both the second direction and the third direction.

In a preferred embodiment, the elastic suspension is elastically deformed along the second direction and the third direction, thereby supporting the mover to vibrate along the second direction and the third direction.

In a preferred embodiment, the elastic coefficient in the second direction of the elastic suspension is a first elastic coefficient, the elastic coefficient in the third direction is a second elastic coefficient, and the first elastic coefficient and the second elastic coefficient have different values.

In a preferred embodiment, the mover is supported by the elastic suspension and vibrates in the second direction at a first natural frequency determined by the first elastic coefficient and the mass of the mover, and the mover vibrates in the third direction at a second natural frequency determined by the elastic coefficient and the mass of the mover, and the first natural frequency and the second natural frequency have different values.

In a preferred embodiment, the permanent magnet unit is a magnet with a roughly thin cuboid shape; the largest and roughly rectangular surface of the permanent magnet unit is a magnetization surface, and each permanent magnet unit is divided into two magnetization regions by one of the two diagonal lines on the magnetization surface, and the two magnetization regions are magnetized to mutually different polarities.

In a preferred embodiment, the permanent magnet unit may be a single permanent magnet with two magnetization regions, or may be formed by combining two permanent magnets each with a single magnetization region.

In a preferred embodiment, the permanent magnet units are respectively attached to the magnetic backs on the front and rear sides of the mover frame, and are located on an extension line in the front and rear directions of the magnetic core of the coil forming the electromagnet set, the magnetization surface of the permanent magnet unit is perpendicular to the extension line; the area of the magnetic back covers the area of a plurality of adjacent permanent magnet units on the same side.

In a preferred embodiment, a corresponding alternating magnetic field is generated by applying an alternating current of a specific frequency to the coil of the electromagnet set; when the electromagnet set generates an alternating magnetic field having the same frequency as the first natural frequency, the mover generates vibration along the second direction; and when the electromagnet set generates an alternating magnetic field having the same frequency as the second natural frequency, the mover generates vibration along the third direction.

In a preferred embodiment, the conductive bobbin flange has a hollowed-out central portion so that the magnetic core can pass through and be embedded therein; when the mover vibrates, the permanent magnet unit therein moves relatively to the conductive core and an eddy current is generated in the conductive bobbin flange, and the magnetic field generated by the eddy current loop acts on the permanent magnet unit in the mover to suppress the mover vibration; after the supply of the AC current is stopped, the suppression on the movement allows the mover to stop more quickly.

In a preferred embodiment, the permanent magnet units of two adjacent electromagnetic driving portions have the same diagonal direction of dividing the magnetization regions; the coils of the electromagnetic driving portions are either connected in series or in parallel to make the number of connection terminals two.

In a preferred embodiment, the diagonal lines of the permanent magnet units of the adjacent two electromagnetic driving portions that divide the magnetization regions are in different directions, and the coils of the electromagnetic driving portions are respectively connected to outside connection terminals so as to make the number of connection terminals four; when the in-phase AC current is applied to the two sets of electromagnetic driving portions individually, the direction of the combined magnetic force generated is one of the second direction or the third direction, and when the AC current applied to the two sets of electromagnetic driving portions are completely out of phase, the direction of the combined magnetic force generated is the other one of the second direction or the third direction.

In summary, in the present invention, the coil and the bobbin are used to form an electromagnet set. When the current passes through the coil and magnetizes the front and rear ends of the magnetic core, a magnetic field is generated. Furthermore, the permanent magnet units are arranged in the casing, facing the two ends of the electromagnet set, the magnetization surface of each permanent magnet unit has two magnetization regions with different polarities, and then the magnetic force between the electromagnet set and the permanent magnet unit is used to drive the mover in two different directions. With the vibrating mover supported on the casing through the elastic suspension, the objective of the present invention is achieved.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be clearly and completely described below in conjunction with the specific embodiments and the accompanying drawings. It should be noted that when an element is referred to as being "mounted or fixed to" another element, it means that it can be directly on the other element or an intervening element may also be present. When an element is referred to as being "connected" to another element, it means that it can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing specific embodiments only and is not intended to limit the invention. As used herein, the term "and/or" includes any and all combinations of one or more of the associated listed items.

Figure 1:
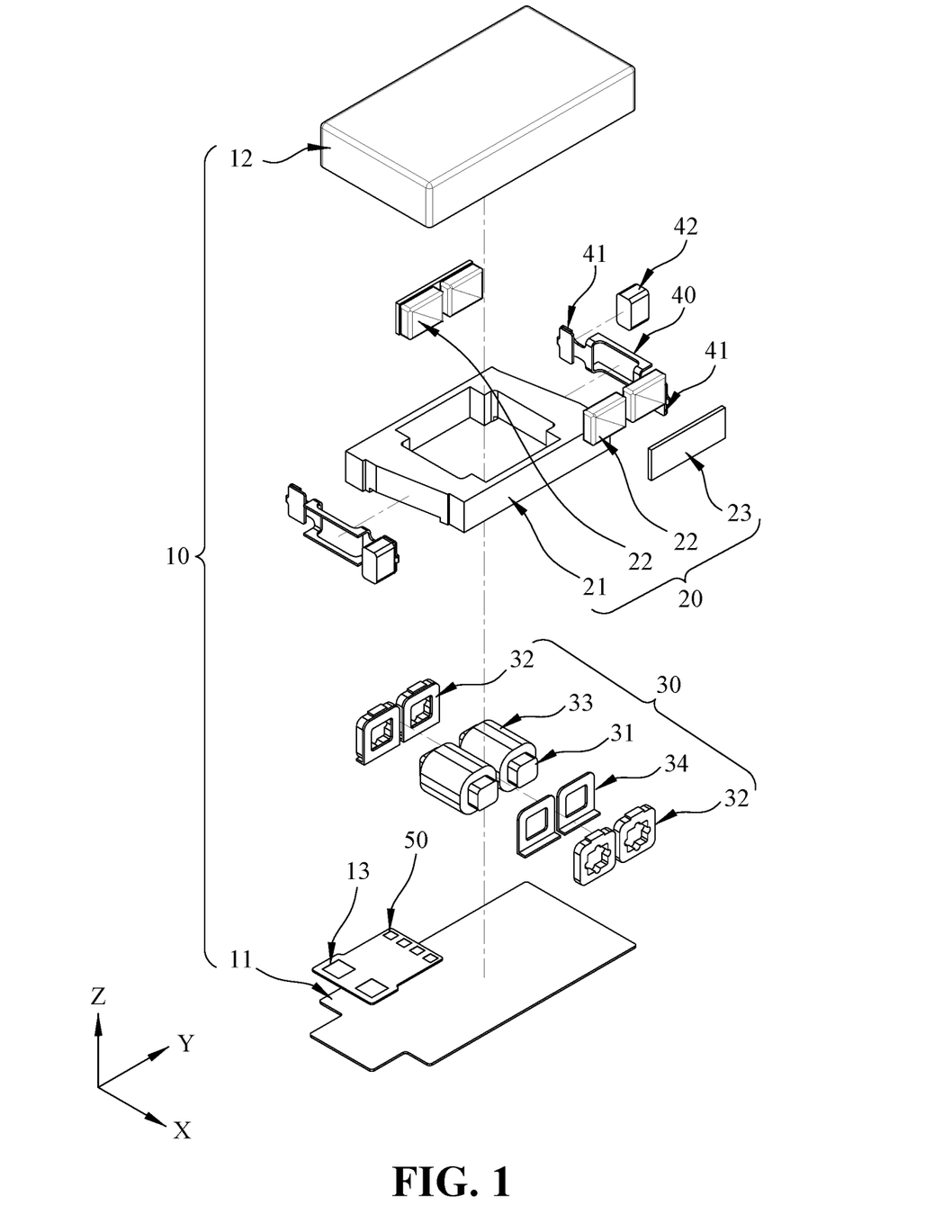
FIG. 1 is an exploded schematic view of the first embodiment of the present invention.

FIG. 1 is an exploded schematic view of the first embodiment of the present invention. A resonant vibration actuator able to generate vibration in two directions provided by the present invention includes: a casing 10, a mover 20, a plurality of electromagnet sets 30, two elastic suspensions 40, and a connection circuit 50.

The following is a detailed description of each component:

As shown in FIG. 1, the casing 10 includes: a bottom 11 and an upper cover 12. The upper cover 12 can cover and be combined with the bottom 11 to form a rectangular box after combination, and the outer surface of the casing 10 is disposed with a connection terminal 13 to electrically connect an external circuit.

The mover 20 includes: a mover frame 21, a plurality of permanent magnet units 22, and two magnetic backs 23. The magnetic backs 23 are disposed inside and close to the mover frame 21. The plurality of permanent magnet units 22 are arranged side by side and adjacent to the magnetic backs 23.

Each electromagnet set 30 includes: a magnetic core 31, two conductive bobbin flanges 32, and a coil 33. The two conductive bobbin flanges 32 are located at both ends of the magnetic core 31 and form a bobbin with the magnetic core 31. The coil 33 is wound around the bobbin, and the electromagnet set 30 is disposed between the two permanent magnet units 22 of the mover 20, and constitutes an electromagnetic driving portion with the permanent magnet units 22 and the magnetic backs 23. Wherein, the magnetic core 31 can be made of magnetic material such as silicon steel, and the conductive bobbin flange 32 can be made of good conductive material such as copper and aluminum. The electromagnet set 30 is further fixed, through an electromagnet rack 34, to either the bottom 11 or the upper cover 12 of the casing 10, or both.

The elastic suspension 40 includes: two connection portions 41 and a connection block 42. The two connection portions 41 are respectively located at two ends of the elastic suspension 40, wherein one of the connection portions 41 is connected to the casing 10 via the connection block 42, and the other is connected to the mover 20 to support the mover 20 to vibrate in the casing 10 along the second direction and the third direction.

The connection circuit 50 is used to connect the coil 33 of the electromagnet set 30 and the connection terminal 13 outside the casing 10; when the coil 33 is energized, the electromagnet set 30 generates a magnetic force to the permanent magnet unit 22 to cause the mover 20 to move relatively within the casing 10 to generate vibration.

In the embodiment of FIG. 1, two electromagnet sets 30 are used, and therefore four permanent magnet units 22 are used. In the following description, two electromagnet sets 30 and four permanent magnet units 22 are used as examples. Furthermore, in the following description, a first direction is defined as being parallel to the magnetic core 31, a second direction is defined as being perpendicular to the first direction and parallel to the bottom 11, and a third direction is defined as being perpendicular to the first direction and the second direction. In other words, the first direction and the second direction define a plane parallel to the bottom 11, and the third direction is perpendicular to the plane. One of the main technical features of the present invention is that the electromagnetic driving portion uses magnetic force to drive the mover 20 along the second direction and the third direction; correspondingly, the elastic suspension 40 is connected to the casing 10 and supports the mover 20 in the casing 10 so that the mover 20 vibrates in the casing 10 in the second direction and the third direction.

As shown in FIG. 1, in the present embodiment, the two magnetic backs 23 are arranged on opposite sides of the mover frame 21 in the first direction and are tightly against the mover frame 21. The four permanent magnet units 22, which are magnets of roughly cuboid shape, are attached to the magnetic backs 23 on the front side and the rear side (that is, the first direction) of the mover frame 21, respectively. Along the first direction, the electromagnet set 30 is arranged correspondingly to the permanent magnet units 22 at both ends by the conductive bobbin flange 32. In other words, along the first direction, the configuration sequence inside the electromagnetic driving portion is two sets of the following arranged side-by-side: the magnetic back 23, the permanent magnet unit 22, the electromagnet set 30, the permanent magnet unit 22, and the magnetic back 23.

It should be noted that, in the present embodiment, the permanent magnet units 22 are respectively located at front and rear sides on the extension line of the magnetic core 31 wound by the coil 33 forming the electromagnet set 30, and the magnetization surface of the permanent magnet unit 22 is perpendicular to the extension line; the area of the magnetic back 23 covers the area of the two adjacent permanent magnet units 22 on the same side.

The conductive bobbin flange 32 has a hollowed-out central portion, so that the magnetic core 31 can pass through and be embedded therein. The cross-sectional area of the magnetic core 31 corresponding to the hollow area of the conductive bobbin flange 32 is not limited to be equal to the cross-sectional area of the portion of the magnetic core 31 where the coil 33 is wound. When the mover 20 vibrates, the permanent magnet unit 22 in the mover 20 moves relatively to the conductive bobbin flange 32, and an eddy current is generated on the conductive bobbin flange 32. The magnetic field generated by the eddy current loop will act on the permanent magnet unit 22 in the mover 20 to further suppress the vibration of the mover 20.

Figure 2:
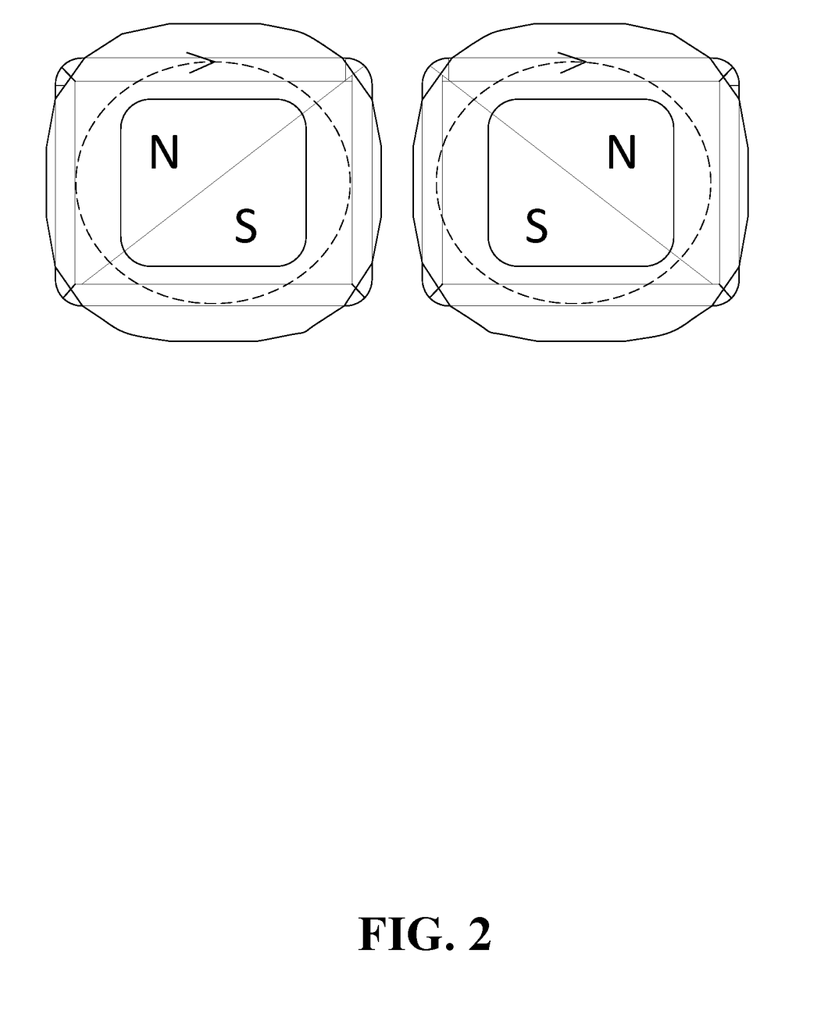
FIG. 2 is a schematic view of the division of the magnetization regions of the permanent magnet unit of the present invention.

FIG. 2 is a schematic view of the permanent magnet unit of the present invention. As shown in FIG. 2, the largest and substantially rectangular surface of the permanent magnet unit 22 is used as the magnetization surface, and each permanent magnet unit 22 is divided into two magnetization regions by one of the two diagonals of the magnetization surface. The two magnetization regions are magnetized with different polarities, such as the N pole and the S pole in FIG. 2. It should be noted that the permanent magnet unit 22 may be a single permanent magnet with two magnetization regions, or may be formed by combining two permanent magnets each with a single magnetization region, which is not limited in the present invention.

Figure 3A:
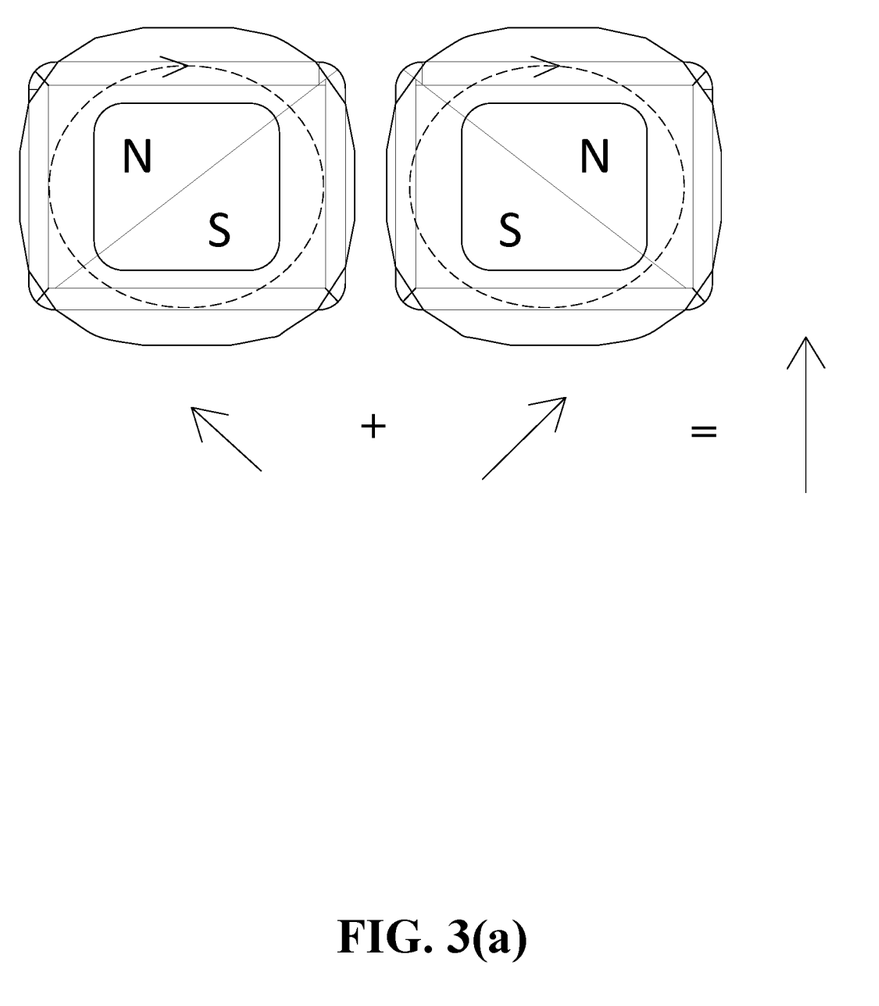
FIGS. 3a and 3b are schematic diagrams of force when the diagonal lines of the divided magnetization regions of adjacent two groups of permanent magnet units of the present invention are in different directions.
Figure 3B:
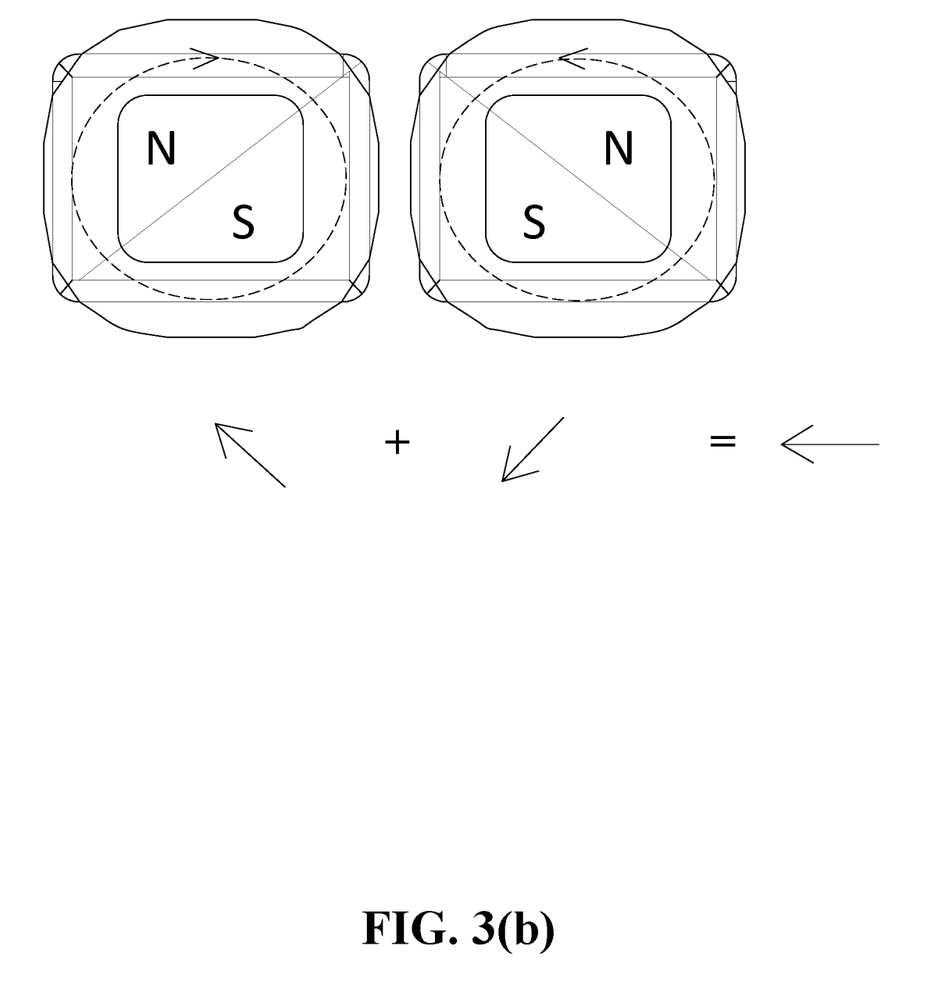

FIGS. 3a and 3b are schematic diagrams of forces when the diagonal lines of the divided magnetization regions of two adjacent sets of permanent magnet units of the present invention are in different orientation. When the permanent magnet units 22 of two adjacent electromagnetic driving portions have the same diagonal division of the magnetization surfaces, the coils 33 of the electromagnetic driving portions can be connected in series or in parallel to make the number of connection terminals 13 two, and the direction of the influence of the magnetic force remains the same.

However, when the lines diagonals of the permanent magnet units 22 of the adjacent two electromagnetic driving portions are in different orientations, the coils 33 of the electromagnetic driving portions are respectively connected to the connection terminals 13, which makes the number of connection terminal 13 four.

As mentioned above, each elastic suspension 40 has two connection portions 41 located respectively at both ends of the elastic suspension 40 along the first direction; one of the connection portions 41 is connected to the casing 10 via the connection block 42, and the other is connected to the mover 20 to support the mover 20 to vibrate in the casing 10 along the second direction and the third direction.

In the present embodiment, both directions along the third direction of a middle portion of the elastic suspension 40 in the first direction include L-shaped feature which is bent outward toward the second direction, and have a hole along the third direction; the L-shaped feature is still connected to the elastic suspension without breaking. The side of the elastic suspension 40 perpendicular to the second direction includes a hole, and the hole does not exceed the elastic suspension 40 in the third direction and the first direction. The elastic suspension 40 is not disconnected in the third direction.

Figure 4:
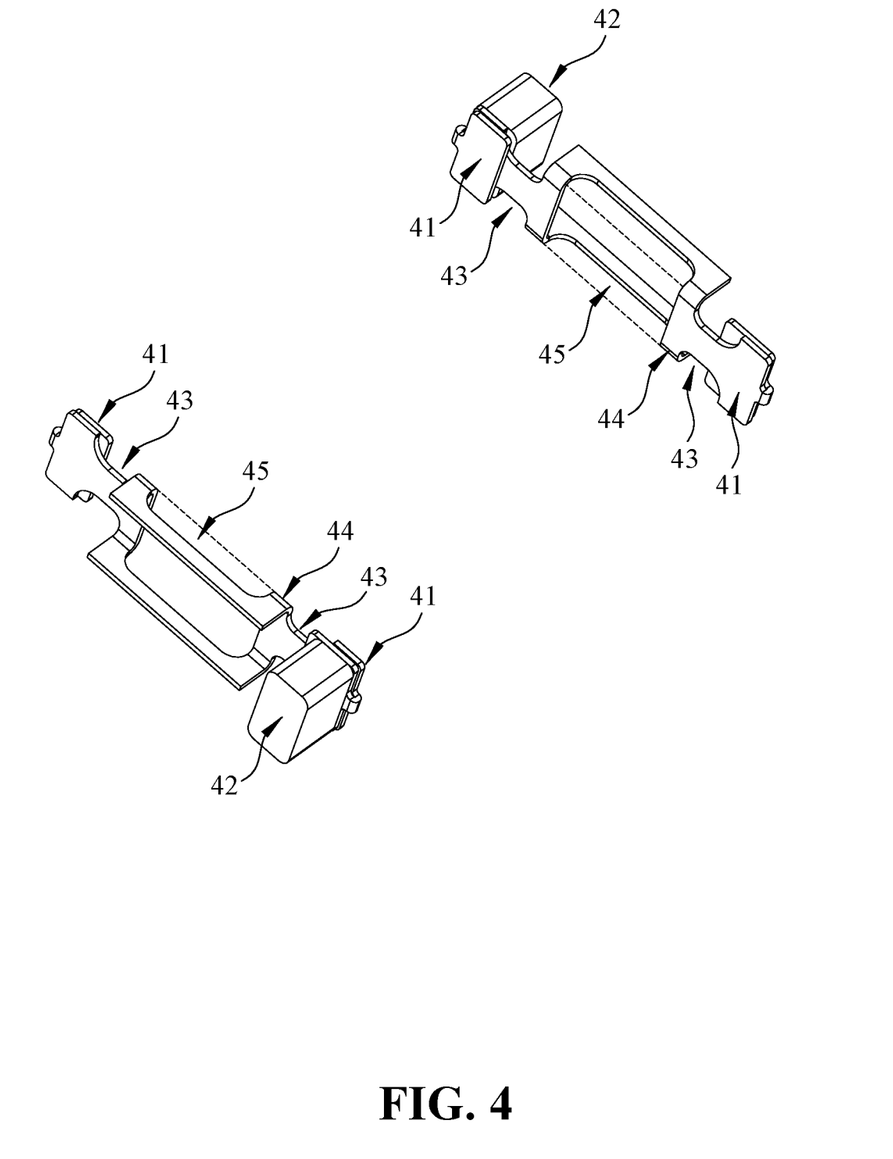
FIG. 4 is a schematic perspective view of the elastic suspension of the present invention.

Further, FIG. 4 is a schematic view of the elastic suspension of the present invention. As shown in FIG. 4, the elastic suspension 40 is a plate spring formed by cutting and bending to further include two connection portions 41, two neck 43, and a deformation support portion 44, wherein the arrangement is as follows in sequence: the connection portion 41, the neck 43, the deformation support portion 44, the neck 43, and the connection portion 41. It should be noted that the neck 43 has a smaller width than the other portions. The two connection portions 41 are located respectively at both ends of the elastic suspension 40 along the first direction, wherein the junction of the connection portion 41 fixed by the connection block 42 to the casing 10 and the junction of the connection portion 41 connected to the mover 20 are located on two different sides of the elastic suspension 40 in the second direction. Each connection portion 41 is connected to the deformation support portion 44 by a neck 43 of a smaller width.

More specifically, in the present embodiment, the deformation support portion 44 is a frame with a hollow portion 45, the frame is bent into a 3-sided square C-shape, the upper and lower sides of the 3-sided square C-shape are bent in the same direction as the connection block 42, and hence the hollow portion 45 is also bent into a 3-sided square C-shape, and the hollow portion 45 extends both ways in both the second and the third directions. Thereby, the elastic suspension 40 can be elastically deformed in the second direction and the third direction, so as to support the mover 20 to vibrate in the second direction and the third direction. In short, the elastic suspension 40 can provide displacement in two different directions.

It should be noted that, in elastic suspension formed by a plate spring having such a folded structure, the elastic deformation in the up-down direction and the elastic deformation in the left-right direction are generally different in degree of difficulty of deformation. Therefore, the elastic coefficient in the left-right direction of the plate-spring elastic suspension is defined as the first elastic coefficient, and the elastic coefficient in the up-down direction is defined as the second elastic coefficient, then the first elastic coefficient and the second elastic coefficient have different values. In other words, in the present embodiment, the elastic coefficient of the elastic suspension 40 in the second direction is defined as the first elastic coefficient, the elastic coefficient in the third direction is defined as the second elastic coefficient, and the first elastic coefficient and the second elastic coefficient have different values.

Further, the mover 20 is supported by the elastic suspension 40 and vibrates in the second direction at a first natural frequency determined by the first elastic coefficient and the mass of the mover 20. Furthermore, the mover 20 vibrates in the third direction at a second natural frequency determined by the second elastic coefficient and the mass of the mover 20. Since the first elastic coefficient and the second elastic coefficient have different values, the first natural frequency and the second natural frequency also have different values.

In the present embodiment, a corresponding alternating magnetic field can be generated by applying an alternating current of a specific frequency to the coil 33 of the electromagnet set 30. When the electromagnet set 30 generates an alternating magnetic field having the same frequency as the first natural frequency, the mover 20 generates vibration in the second direction; and when the electromagnet group 30 generates an alternating magnetic field having the same frequency as the second natural frequency, the mover 20 generates vibration in the third direction.

Furthermore, after the supply of the aforementioned AC current is stopped, the aforementioned effect of suppressing the vibration of the mover 20 enables the mover 20 to stop more quickly.

In summary, in the resonant vibration actuator of the present invention, the coil and the bobbin are used to form an electromagnet set. When the current passes through the coil and magnetizes the front and rear ends of the magnetic core, a magnetic field is generated. Furthermore, the permanent magnet units are arranged in the casing, facing the two ends of the electromagnet set, the magnetization surface of each permanent magnet unit has two magnetization regions with different polarities, and then the magnetic force between the electromagnet set and the permanent magnet unit is used to drive the mover in two different directions. With the vibrating mover supported on the casing through the elastic suspension, the objective of the present invention is achieved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A resonant vibration actuator, comprising:
   a casing, a mover, a plurality of electromagnet sets, two elastic suspensions, and a connection circuit;
   the casing further comprising: a bottom and an upper cover, the upper cover able to cover and be combined with the bottom to form a rectangular box, and one or more connection terminals being disposed outside the casing for electrically connecting to an external circuit;
   the mover further comprising: a mover frame, a plurality of permanent magnet units, and two magnetic backs, the two magnetic backs being respectively disposed on opposite sides of the mover frame, and the plurality of permanent magnet units being arranged side by side and adjacent to the two magnetic backs;
   each electromagnet set further comprising: a magnetic core, two conductive bobbin flanges, and a coil, the two conductive bobbin flanges being respectively located at two ends of the magnetic core, and forming a bobbin together with the magnetic core, the coil being wound on the bobbin, the electromagnet set being arranged between two permanent magnet units of the mover, and forming an electromagnetic driving portion with the two permanent magnet units and the magnetic backs;
   each elastic suspension further comprising: two connection portions and a connection block, the two connection portions being respectively located at two ends of the elastic suspension, with one connection portions fixed to the casing by the connection block, and the other connection portion connected to the mover;
   the connection circuit being used to connect the coil of the electromagnet set and the one or more connection terminals outside the casing;
   wherein a first direction is defined as being parallel to the magnetic core, a second direction is defined as being perpendicular to the first direction and parallel to the bottom, and a third direction is defined as being perpendicular to the first and second directions; the electromagnetic driving portion uses magnetic force to drive the mover along the second direction and the third direction; the elastic suspension is connected to the casing and supports the mover in the casing, so that the mover moving along the second direction and the third direction vibrates within the enclosure;

wherein, a middle portion of the elastic suspension along the first direction has an L-shaped feature extending both ways in the third direction and bending outward toward the second direction, and a hole in the third direction, the L-shaped feature remains connected to the elastic suspension; and a side of the elastic suspension perpendicular to the second direction has a hole, not exceeding the elastic suspension in the third direction and the first direction; and each permanent magnet unit being a plate magnet with a cuboid shape; a largest rectangular surface of the permanent magnet unit being a magnetization surface, and each permanent magnet unit being divided into two magnetization regions by one of two diagonal lines of the magnetization surface, and the two magnetization regions being magnetized to mutually different polarities.

2. The resonant vibration actuator according to claim 1, wherein the electromagnet set is fixed by an electromagnet rack to either the bottom or the upper cover of the casing.

3. The resonant vibration actuator according to claim 1, wherein the elastic suspension is a plate spring formed by cutting and bending to comprise a first connection portion, a first neck, a deformation support portion, a second neck, and a second connection portion connected in order, the first connection portion is fixed to the casing by the connection block, the second connection portion is connected to the mover, and the two necks have a smaller width than the two connection portions and the deformation support portion.

4. The resonant vibration actuator according to claim 3, wherein the deformation support portion is a frame with a hollow portion, the frame is bent into a 3-sided square C-shape, upper and lower sides of the 3-sided square C-shape are bent in the same direction as the connection block, and the hollow portion is also a 3-sided square C-shape, and the hollow portion includes hollows in the second direction and the third direction.

5. The resonant vibration actuator according to claim 1, wherein the elastic suspension is elastically deformed in the second direction or the third direction to allow the mover to vibrate in the second direction or the third direction.

6. The resonant vibration actuator according to claim 5, wherein an elastic coefficient of the elastic suspension in the second direction is a first elastic coefficient, an elastic coefficient in the third direction is a second elastic coefficient, and the first elastic coefficient and the second elastic coefficient have different values.

7. The resonant vibration actuator according to claim 1, wherein the permanent magnet unit is a single permanent magnet with two magnetization regions, or is formed by combining two permanent magnets each with a single magnetization region.

8. The resonant vibration actuator according to claim 7, wherein the permanent magnet units of two adjacent electromagnetic driving portions are divided by the diagonal lines having the same orientation, and the coils of the electromagnetic driving portions are connected either in series or in parallel to make the number of the connection terminals two.

9. The resonant vibration actuator according to claim 7, wherein the permanent magnet units of two adjacent electromagnetic driving portions are divided by the diagonal lines having different orientations, and the coils of the electromagnetic driving portion are connected respectively to the connection terminals, which makes the number of the connection terminals four.

10. The resonant vibration actuator according to claim 1, wherein the permanent magnet units are respectively attached to the magnetic backs arranged on front and rear sides of the mover frame, the permanent magnet units are located on both sides of an extension line of the magnetic core wound with the coil, the magnetization surface of the permanent magnet unit is perpendicular to the extension line, and the magnetic back on one side covers the plurality of adjacent permanent magnet units on the same side.

* * * * *